United States Patent
Schieman et al.

(10) Patent No.: US 10,952,087 B2
(45) Date of Patent: Mar. 16, 2021

(54) DETECTING RESOURCE ACCESS

(71) Applicant: BlackBerry Limited, Waterloo (CA)

(72) Inventors: Adam Richard Schieman, Toronto (CA); Maxim Zezin, Nizhny Novgorod (RU); Dale Ducharme, Cambridge (CA); Michael George Langlois, Almonte (CA); Eugene Chin, Oakville (CA); Sue Hsiu Ying Ludwig, Mississauga (CA); Jason Scott Loustel, Mississauga (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/335,347

(22) Filed: Oct. 26, 2016

(65) Prior Publication Data
US 2017/0118610 A1   Apr. 27, 2017

Related U.S. Application Data

(60) Provisional application No. 62/247,149, filed on Oct. 27, 2015.

(51) Int. Cl.
*H04L 12/16* (2006.01)
*H04W 24/10* (2009.01)
*H04L 12/26* (2006.01)
*G06F 11/30* (2006.01)

(52) U.S. Cl.
CPC .......... *H04W 24/10* (2013.01); *G06F 11/302* (2013.01); *H04L 43/045* (2013.01)

(58) Field of Classification Search
CPC .......... G06F 2201/865; H04L 43/045
See application file for complete search history.

(56) References Cited

U.S. PATENT DOCUMENTS

| | | | |
|---|---|---|---|
| 6,975,330 B1 | 12/2005 | Charlton et al. | |
| 7,230,970 B1 | 6/2007 | Bryant | |
| 8,644,881 B2 | 2/2014 | Kim et al. | |
| 8,914,494 B2 * | 12/2014 | Bunch | H04L 43/045 |
| | | | 709/224 |
| 2002/0177986 A1 | 11/2002 | Moeckel et al. | |
| 2003/0122874 A1 | 7/2003 | Dieberger et al. | |

(Continued)

FOREIGN PATENT DOCUMENTS

| CN | 100542139 C | 9/2009 |
|---|---|---|
| CN | 102082874 A | 6/2011 |

(Continued)

OTHER PUBLICATIONS

International Search Report and Written Opinion issued in International Application No. PCT/US16/58921 dated Jan. 17, 2017.

(Continued)

*Primary Examiner* — Bo Hui A Zhu
(74) *Attorney, Agent, or Firm* — Fish & Richardson P.C.

(57) ABSTRACT

Systems, methods, and software can be used to detect resource access. In some aspect, a monitoring period for monitoring resource access on an electronic device is determined. A number of accesses to a resource on the electronic device made by an application during the monitoring period is determined. Information associated with at least one access to the resource is outputted on the electronic device.

18 Claims, 16 Drawing Sheets

(56) References Cited

U.S. PATENT DOCUMENTS

| | | | |
|---|---|---|---|
| 2007/0028763 | A1 | 2/2007 | Oestvall |
| 2012/0245941 | A1 | 9/2012 | Cheyer |
| 2012/0326947 | A1 | 12/2012 | Fujiwaka |
| 2013/0107029 | A1 | 5/2013 | Knasel et al. |
| 2013/0152192 | A1 | 6/2013 | Dischamp |
| 2013/0329075 | A1 | 12/2013 | Liang et al. |
| 2014/0007106 | A1 | 1/2014 | Weksler et al. |
| 2014/0109085 | A1 | 4/2014 | Carrara et al. |
| 2014/0143864 | A1 | 5/2014 | Miliefsky |
| 2014/0282272 | A1 | 9/2014 | Kies |
| 2016/0062793 | A1 | 3/2016 | Chu |

FOREIGN PATENT DOCUMENTS

| | | |
|---|---|---|
| CN | 103874986 | 6/2014 |
| CN | 104766005 | 7/2015 |
| WO | 2015056056 | 4/2015 |

OTHER PUBLICATIONS

International Search Report and Written Opinion issued in International Application No. PCT/US16/58924 dated Jan. 25, 2017.
Non-Final Office Action issued in U.S. Appl. No. 15/335,355 dated Nov. 29, 2018, 13 pages.
United States Office Action in U.S. Appl. No. 15/335,355, dated Mar. 1, 2018, 16 pages.
International Preliminary Report on Patentability issued in International Application No. PCT/US16/58921 dated Apr. 5, 2018, 18 pages.
United States (Final) Office Action issued in U.S. Appl. No. 15/335,355 dated Jul. 19, 2018, 13 pages.
Advisory Action issued in U.S. Appl. No. 15/335,355 dated Oct. 5, 2018, 2 pages.
Almuhimedi et al., "Your Location has been Shared 5,398 Times! A Field Study on Mobile App Privacy Nudging," Proceedings of the 33rd annual ACM conference on human factors in computing systems, ACM, Apr. 18, 2015, 10 pages.
Extended European Search Report issued in European Application No. 16860712.5 dated Apr. 26, 2019, 11 pages.
Final Office Action issued in U.S. Appl. No. 15/335,355 dated Jun. 10, 2019, 24 pages.
Extended European Search Report issued in European Application No. 16860713.3 dated Apr. 11, 2019, 11 pages.
Notice of allowance issued in U.S. Appl. No. 15/335,355 dated Oct. 8, 2019, 9 pages.
Office Action issued in Chinese Application No. 201680076372.X dated Jun. 19, 2020, 21 pages (with English translation).
Communication Pursuant to Article 94 (3) EPC issued in European Application No. 16860712.5 dated Nov. 4, 2020, 7 pages.
Office Action issued in Chinese Application No. 201680073626.2 dated Nov. 2, 2020, 29 pages (with English translation).

\* cited by examiner

DETECTING RESOURCE ACCESS

CROSS REFERENCE TO RELATED APPLICATIONS

This application claims the benefit of priority of U.S. application Ser. No. 62/247,149, filed on Oct. 27, 2015, which is incorporated by reference herein in its entirety.

BACKGROUND

The present disclosure relates to detecting resource access in an electronic device. Many electronic devices, e.g., mobile devices or other communication devices, enable users to run applications on the communication devices. The applications may access resources of the communication devices.

DESCRIPTION OF DRAWINGS

FIG. 12, including

Like reference numbers and designations in the various drawings indicate like elements.

DETAILED DESCRIPTION

Figure 1:
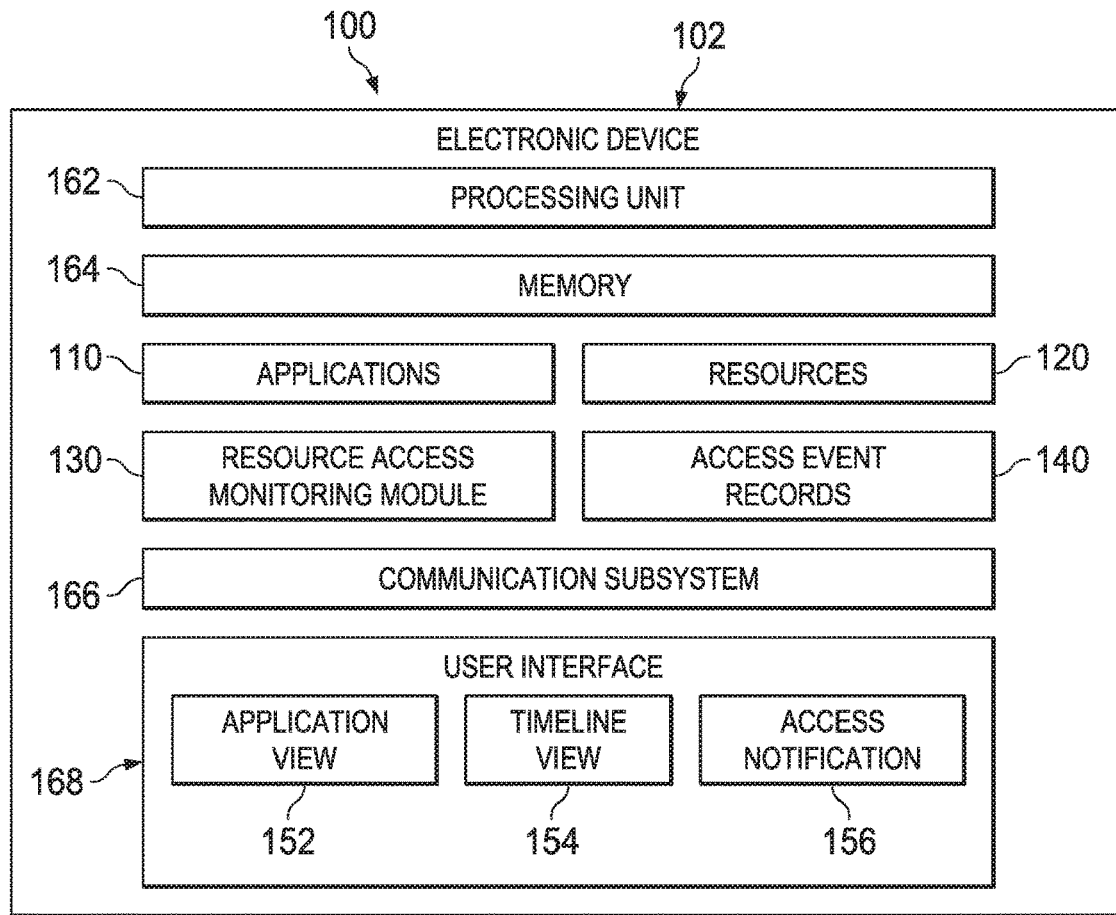
FIG. 1 is a schematic diagram showing an example of detecting resource access in an example electronic device.

In some cases, an operating system of an electronic device, e.g., a mobile device, can set permissions for an application to access a resource on the communication devices. In some cases, a resource can include an application, set of applications, software, software modules, hardware, or any combination thereof that can be configured to provide information or services. Examples of resources include a camera, a microphone, a location determination module, e.g., a Global Positioning Service (GPS) module, contact information, text or multimedia messaging module, folders and files, and etc.

In some cases, when an application is installed, the operating system can ask the user whether the application has the permission to access one or more resources. If the user grants the permission, the application can access the resources without further permissions from the users. The access can occur at any time and location. In some cases, a user may receive a notification if an application attempts to access a resource without permission. However, a user may not receive a notification if an application accesses a resource with permission.

In some cases, granting permissions at installation may not be sufficient to provide privacy and security to a user. A user may be unaware of the circumstances of a resource access made by an application. For example, the application may turn on a microphone during a private meeting or at midnight without user knowledge. Therefore, the user may not be able to determine whether the application is accessing the resource illegitimately.

In some cases, an application may operate in the background of the operating system. A user does not know when and if an application is operating in the background of the operating system. Therefore, a user may not be aware that an application is accessing a specific resource while the application is operating in the background.

In some cases, an application may access a camera preview buffer without user knowledge. A camera preview buffer is a buffer that stores image files captured by a camera when the camera is in a preview mode. In some cases, prior to taking a picture, the camera may capture an image and store the image in the preview buffer. In some cases, the image may be outputted, e.g., displayed in the screen, so that the user can review the image before deciding to take the picture. When the camera is instructed to take a picture, e.g., by a user click or a tap, the image file is copied into a folder that stores the photos. If the camera does not receive the instruction to take the picture, the image file remains in the preview buffer. In some cases, the image file in the preview buffer can be deleted after the picture is taken. In some cases, the image file in the preview buffer can be deleted after a period of time or the buffer is overflown. In some cases, while the operating system may capture events when a picture or a video is taken, the operating system does not monitor when a preview buffer is accessed. Therefore, a user may not be aware that an application is accessing the preview of the hidden pictures or videos.

In some cases, accesses to a resource on an electronic device can be monitored. In some cases, a number of accesses to a resource made by one or more applications over a monitoring period can be determined. In some cases, information associated with an access, e.g., the time, the duration, the application that accesses the resource, and the location of the electronic device when the access is made, can be determined. In some cases, the information associated with one or more accesses can be outputted to the user. Therefore, a user can review the resource access record and determine whether an application made illegitimate access to a resource. FIGS. 1-16 and associated descriptions provide additional details of these implementations.

In some cases, when an application attempts to access a resource, whether an application is operating in the background of the operating system or the foreground of the operating system is determined. In some cases, a notification is generated to alert the user that a background application attempts to access a resource. This approach may enable a user to detect an illegitimate access made by a background application. FIGS. 1-16 and associated descriptions provide additional details of these implementations.

In some cases, an access to a camera preview buffer can be configured as a resource access event. The event can be recorded and displayed. In some cases, notifications can be generated to indicate an attempt to access the camera preview buffer. In some cases, whether the application is running on the foreground or the background is determined. Therefore, the notification can indicate that a background application attempts to access the camera preview buffer. This approach may enable a user to detect an illegitimate access to the camera preview buffer. FIGS. 1-16 and associated descriptions provide additional details of these implementations.

FIG. 1 is a schematic diagram 100 showing an example of detecting resource access in an example electronic device 102. The electronic device 102 includes a processing unit 162, a communication subsystem 166, a user interface 168, and a memory 164. The electronic device 102 also includes applications 110, resources 120, resource access monitoring module 130, and access event records 140. An electronic device may include additional, different, or fewer features, as appropriate.

The example processing unit 162 can include one or more processing components (alternatively referred to as "processors" or "central processing units" (CPUs)) configured to execute instructions related to one or more of the processes, steps, or actions described above in connection with one or more of the implementations disclosed herein. In some implementations, the processing unit 162 can be configured to generate control information, such as a measurement report, or respond to received information, such as control information from a network node. The processing unit 162 can also be configured to make a radio resource management (RRM) decision such as cell selection/reselection information or trigger a measurement report. The processing unit 162 can also include other auxiliary components, such as random access memory (RAM) and read-only memory (ROM).

The example communication subsystem 166 can be configured to provide wireless or wireline communication for data or control information provided by the processing unit 162. The communication subsystem 166 can include, for example, one or more antennas, a receiver, a transmitter, a local oscillator, a mixer, and a digital signal processing (DSP) unit. In some implementations, the communication subsystem 166 can support multiple input multiple output (MIMO) transmissions. In some implementations, the receivers in the communication subsystem 166 can be an advanced receiver or a baseline receiver. Two receivers can be implemented with identical, similar, or different receiver processing algorithms.

The example user interface 168 can include, for example, one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. As shown in FIG. 1, the example user interface 168 can be configured to present an application view 152, a timeline view 154, and an access notification 156. The application view 152 represents a graphic user interface that displays one or more applications and the resources that have been accessed by the one or more applications. The timeline view 154 represents a graphic user interface that displays information associated with resource accesses during a monitoring period. The access notification 156 represents a graphic user interface that indicates a resource access or an attempted resource access to a user. FIGS. 2-16 and associated descriptions provide additional details of these implementations.

The example memory 164 can be a computer-readable storage medium on the electronic device 102. Examples of the memory 164 include volatile and non-volatile memory, magnetic media, optical media, random access memory (RAM), read-only memory (ROM), removable media, and others. The memory 164 can store an operating system (OS) of the electronic device 102 and various other computer-executable software programs for performing one or more of the processes, steps, or actions described above.

As shown in FIG. 1, the electronic device 102 includes resources 120. The resources 120 represent an application, set of applications, software, software modules, hardware, or combination thereof that can be configured to provide information or services. The resources 120 can include folders or files that provide private information, e.g., contact, photo images, voice recordings, video recordings, emails, texts, voicemails, the camera preview buffer, and confidential files. The resources 120 can also include a hardware component, e.g., a microphone, a camera, or a GPS module, and its associated driver or application programming interface (API).

The electronic device 102 also includes applications 110. The applications 110 include programs, modules, scripts, processes, or other objects that can be configured to access one or more resources in the resources 120. For example, applications 110 can be implemented as Enterprise Java Beans (EJBs). Design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to the electronic device 102, one or more processes associated with an application may be stored, referenced, or executed remotely. For example, a portion of an application may be an interface to a web service that is remotely executed. Moreover, an application may be a child or sub-module of another software module (not illustrated). The applications 110 can include native applications in the operating systems, enterprise applications administrated by an employer of the user, or third-party applications downloaded by the user.

The electronic device 102 also includes a resource access monitoring module 130. The resource access monitoring module 130 represents an application, set of applications, software, software modules, hardware, or any combination thereof that can be configured to detect a resource access made by an application. In some cases, when an application in the applications 110 accesses a resource in the resources 120, an event is generated. The event is reported to the resource access monitoring module 130. The resource access monitoring module 130 can determine the name of the resource, the name of the application, the time of the access, the duration of the access, the location of the access, or any other information associated with the event. In some cases, the resource access monitoring module 130 can generate a notification in response to the event. In some cases, the resource access monitoring module 130 can store the information associated with the event in the access event records 140. In some cases, the resource access monitoring module 130 can retrieve the resource access events during a monitoring period, compile the number of accesses made by different applications to different resources, and generate a graphic user interface representation based on the compiled number of accesses. FIGS. 2-16 and associated descriptions provide additional details of these implementations.

Turning to a general description, an electronic device, e.g., the electronic device 102, may include, without limitation, any of the following: mobile electronic device, computing device, user device, mobile station, subscriber station, portable electronic device, mobile communications device, wireless modem, or wireless terminal. Examples of an electronic device (e.g., the electronic device 102) may include a cellular phone, personal data assistant (PDA), smart phone, laptop, tablet personal computer (PC), pager, portable computer, portable gaming device, wearable electronic device, health/medical/fitness device, camera, vehicle, or other mobile communications device having components for communicating voice or data via a wireless communication network. The wireless communication network may include a wireless link over at least one of a licensed spectrum and an unlicensed spectrum. The term "electronic device" can also refer to any hardware or software component that can terminate a communication session for a user. In addition, the terms "user equipment," "UE," "user equipment device," "user agent," "UA," "user device," and "mobile device" can be used synonymously herein.

Figure 2:
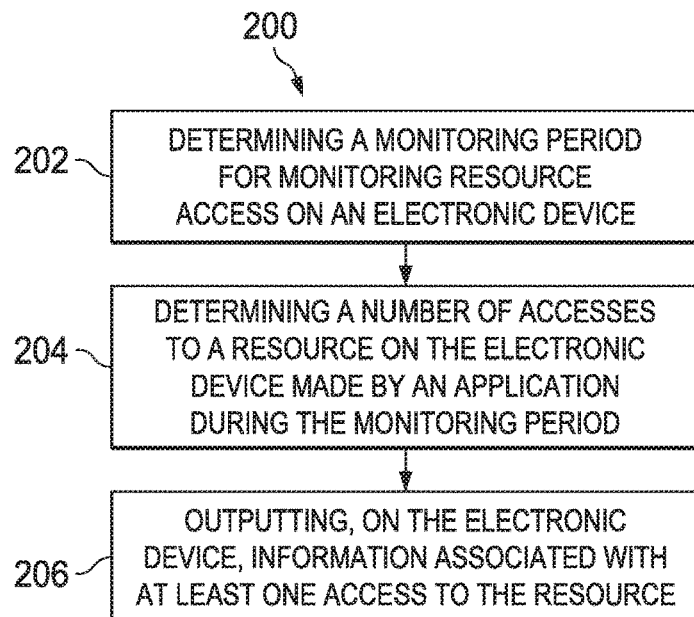
FIG. 2 is a flowchart showing an example process for detecting resource access.

FIG. 2 is a flowchart showing an example process 200 for detecting resource access. The process 200 can be implemented by a communication device in a communication system. For example, the process 200 can be implemented by the electronic device 102 shown in FIG. 1 or by another type of system or module. The example process 200 shown in FIG. 2 can also be implemented using additional, fewer, or different operations, which can be performed in the order shown or in a different order.

The example process 200 begins at 202, where a monitoring period for monitoring resource access on an electronic device is determined. In some cases, the monitoring period can be configured by a system administrator, a user of the electronic device, or a combination thereof. In some cases, default monitoring periods can be set by an operating system of the electronic device. In some cases, the default monitoring periods can be changed by a system administrator, a user of the electronic device, or a combination thereof. In some cases, more than one monitoring period, e.g., a day, a week, and a month, can be configured.

At 204, a number of accesses to a resource on the electronic device made by an application during the monitoring period is determined. In some cases, the resource to be monitored can be configured by a system administrator, a user of the electronic device, or a combination thereof. In some cases, more than one resources can be configured for monitoring. In some cases, the operating system can set by default one or more resources to be monitored. A system administrator, a user of the electronic device, or a combination thereof can add, remove, or change the resources to be monitored.

In some cases, a system administrator, a user of the electronic device, or a combination thereof can configure one or more applications whose resource access is monitored. In some cases, the operating system can set by default one or more applications to be monitored. A system administrator, a user of the electronic device, or a combination thereof can add, remove, or change the applications to be monitored. In some cases, the resource access of all the applications can be monitored. In some cases, a subset of applications, e.g., the applications that are provided from third party, can be monitored. In some cases, an access to a resource by an application may be monitored when the application has permission to access the resource.

In some cases, an event can be generated when an application accesses a resource configured to be monitored. The event can be captured by the operating system, e.g., by the resource access monitoring module 130 shown in FIG. 1. The information associated with the event can be recorded and stored. In some cases, a timestamp corresponding to the event can be determined and included in the stored information associated with the event. In some cases, a duration corresponding to the event can be determined. For example, an event can be generated when an application accesses a microphone. If the microphone is turned on for 4 seconds, a duration of 4 seconds can be included in the information associated with the event. In some cases, a location of the electronic device corresponding to the event can be determined. For example, the resource access monitoring module 130 can use the location determining module of the electronic device, e.g., a GPS, to determine the location of the electronic device when the event occurred. The location information can be included in the stored information associated with the event.

Figure 3:
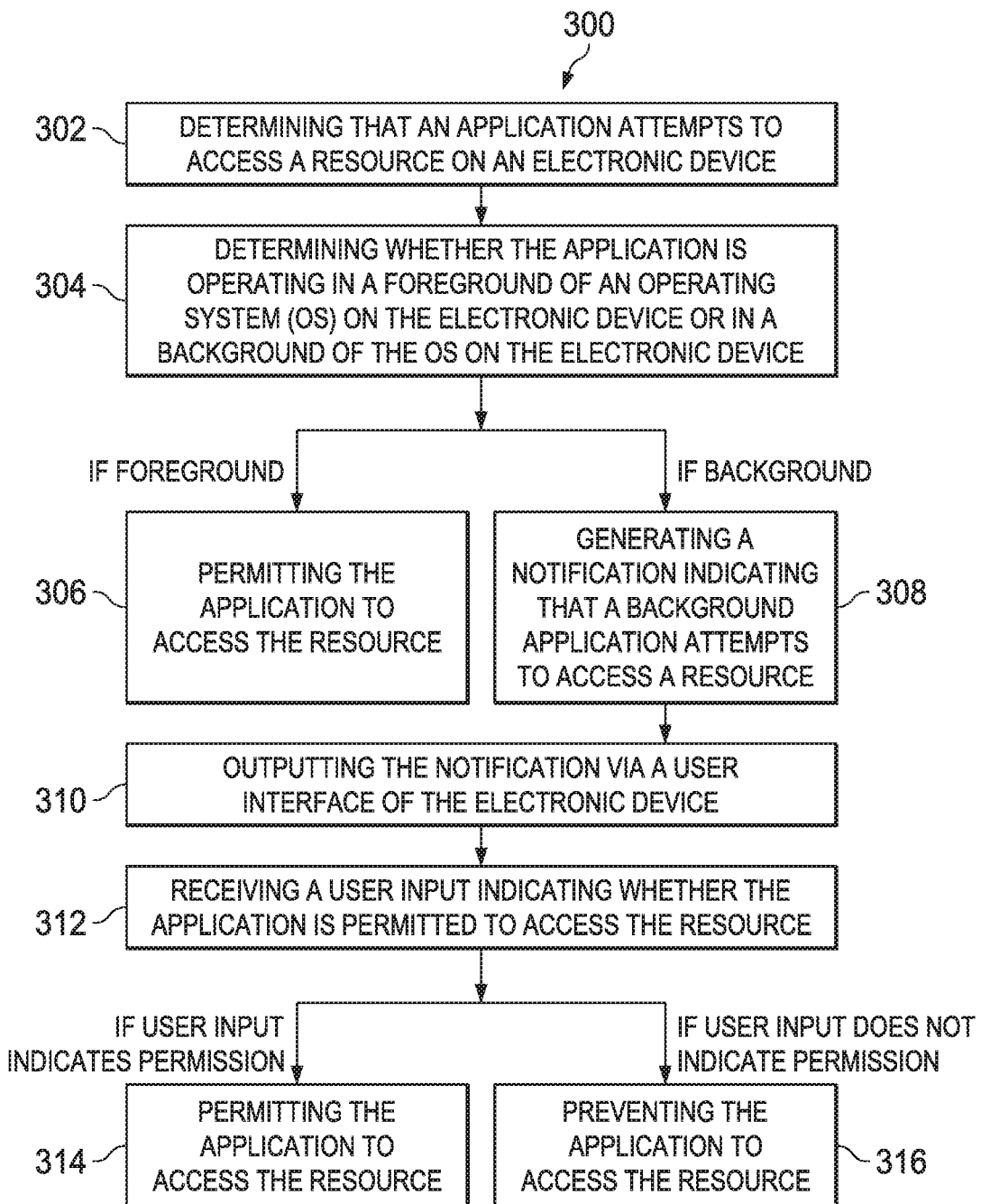
FIG. 3 is a flowchart showing an example process for monitoring background resource access.

In some cases, additional attributes of the resource access event can be determined. For example, whether the application that accesses the resources is operating in the foreground or in the background can be determined. These attributes can be included in the information associated with the event. In some cases, an operating system of the electronic device, a user of the electronic device, a system administrator, or a combination thereof can configure the resource access monitoring module 130 to monitor the events that have one or more specific attributes. In some cases, only the events that are triggered by background applications are monitored, recorded, outputted, prevented, or a combination thereof. FIG. 3 and associated descriptions provide additional details for detecting background resource access.

As another example, the state of the device e.g., an idle state or an active state can be determined. Examples of an idle device include a device in sleep, power-saving, doze, bedtime, or standby mode. Examples of an idle device further include a locked device (wherein authentication is needed in order to access the device). A screen saver may be displayed while the device is idle. The display of the device may be off when the device is in sleep, power-saving, doze, bedtime, or standby mode. A lock screen may be displayed while the device is locked. These attributes can be included in the information associated with the event. In some cases, an operating system of the electronic device, a user of the electronic device, a system administrator, or a combination thereof can configure the resource access monitoring module 130 to monitor the events that have one or more specific attributes. Events during an idle state may be more suspicious and therefore monitored, recorded, outputted, prevented, or a combination thereof. For example, data being transmitted overnight while the device is locked may be considered unusual activity and may trigger an event being generated.

In some cases, a composite event can be configured. A composite event can include the occurrence of more than one resource access event in a short time frame. In one example, a user can configure a composite event that includes an access to a folder with sensitive information (e.g., a folder containing sensitive photos) and an access to a radio component in the electronic device. If these events occurred in a short time frame within each other, e.g., 5 seconds, a composite event is generated and captured. In some cases, the length of the time frame can be configured by the operating system, an administrator, a user, or a combination thereof. In some cases, the user can configure the composite event to include accesses that are made by only the background applications. The composite event can be monitored, recorded, outputted, prevented, or a combination thereof. This approach can enable the user to prevent an upload of sensitive information without the user's knowledge.

Figure 5:
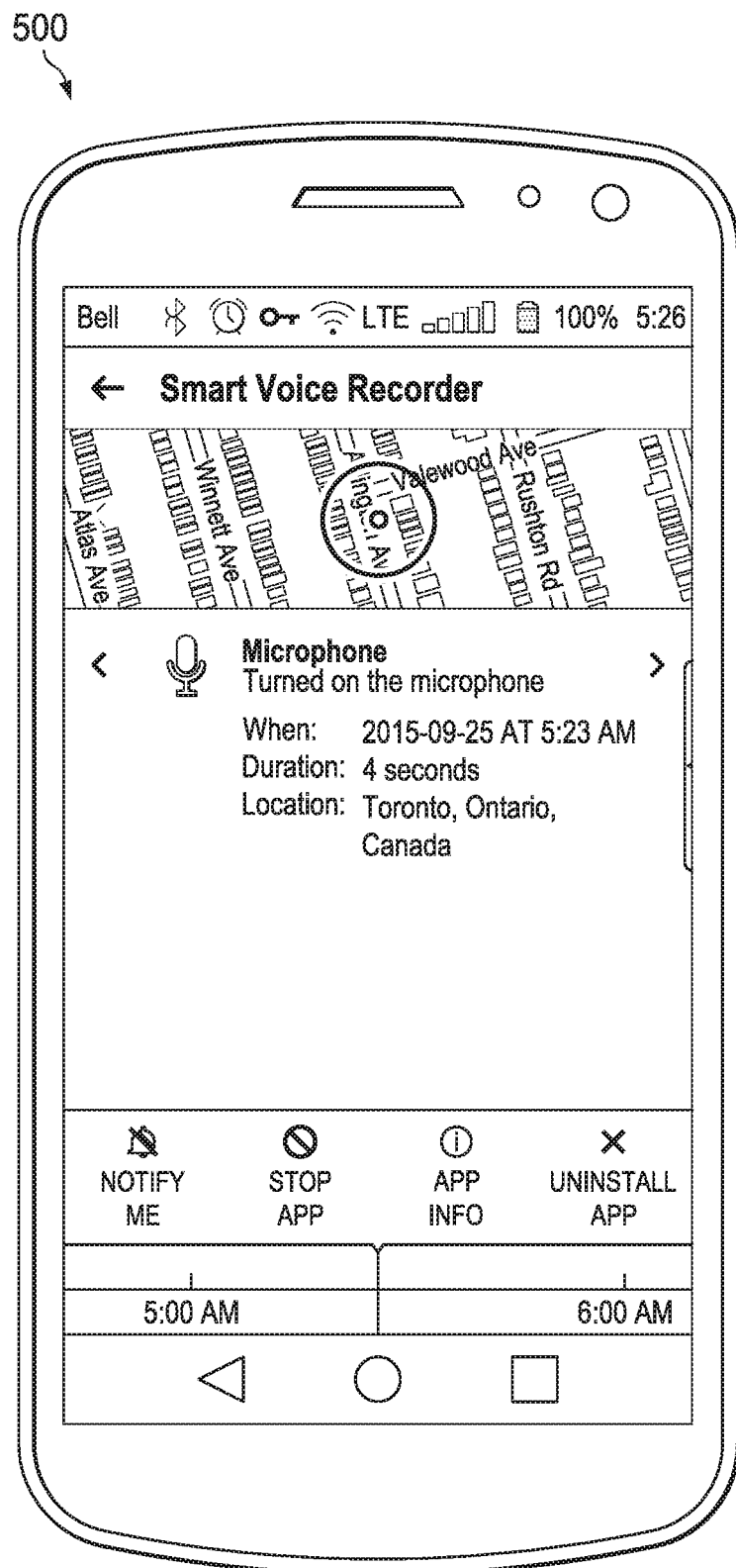
FIG. 5 shows an example graphic user interface outputting one resource access event.
Figure 6:
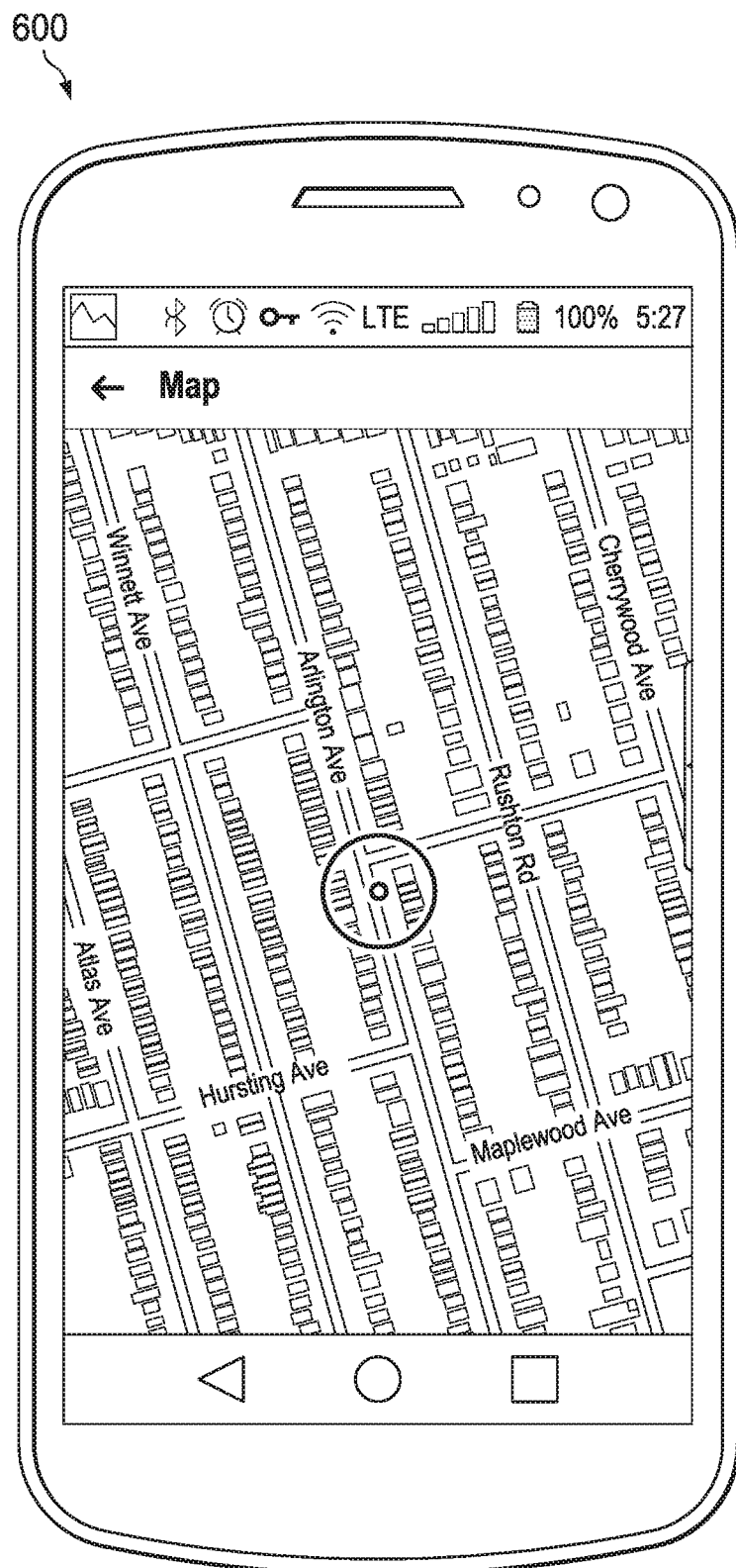
FIG. 6 shows an example zoomed map.

At 206, information associated with at least one resource access is outputted on the electronic device. In some cases, information associated with one event or one composite event can be outputted on the electronic device. For example, the event can be outputted when the resource is accessed. FIG. 5 shows an example graphic user interface 500 outputting one resource access event. As shown in FIG. 5, an application smart voice recorder has turned on a microphone at 5:25 am on Sep. 25, 2015. The microphone is turned on for 4 seconds. As shown in the FIG. 5, the graphic user interface 500 includes the time, duration, and the location of the event associated with accessing the resource. In some cases, the graphic user interface 500 can also include a map that shows the location of the event. In some cases, the map can be zoomed when it is selected. FIG. 6 shows an example zoomed map 600. In some cases, the selection can be performed by tapping, clicking, or any other user interface actions.

In some cases, as shown in FIG. 5, the graphic user interface that outputs the event also includes user interface objects that enable the user to set user preference with respect to the application indicated in the graphic user interface for accessing a resource. For example, the user can select a user interface object titled "notify me" to configure a notification to be generated the next time the application accesses the same resource. The user can select a user interface object titled "stop app" to terminate the application. The user can select a user interface object titled "uninstall app" to uninstall the application. The user can also select a user interface object titled "app info" to query additional information about the application, e.g., when the application is installed, the source of the application, and other information.

In some cases, as shown in FIGS. 5-6, the information associated with the event, e.g., the name of the resource, the application that accesses the resource, the time, the duration, and the location of the access, can be outputted.

Figure 7:
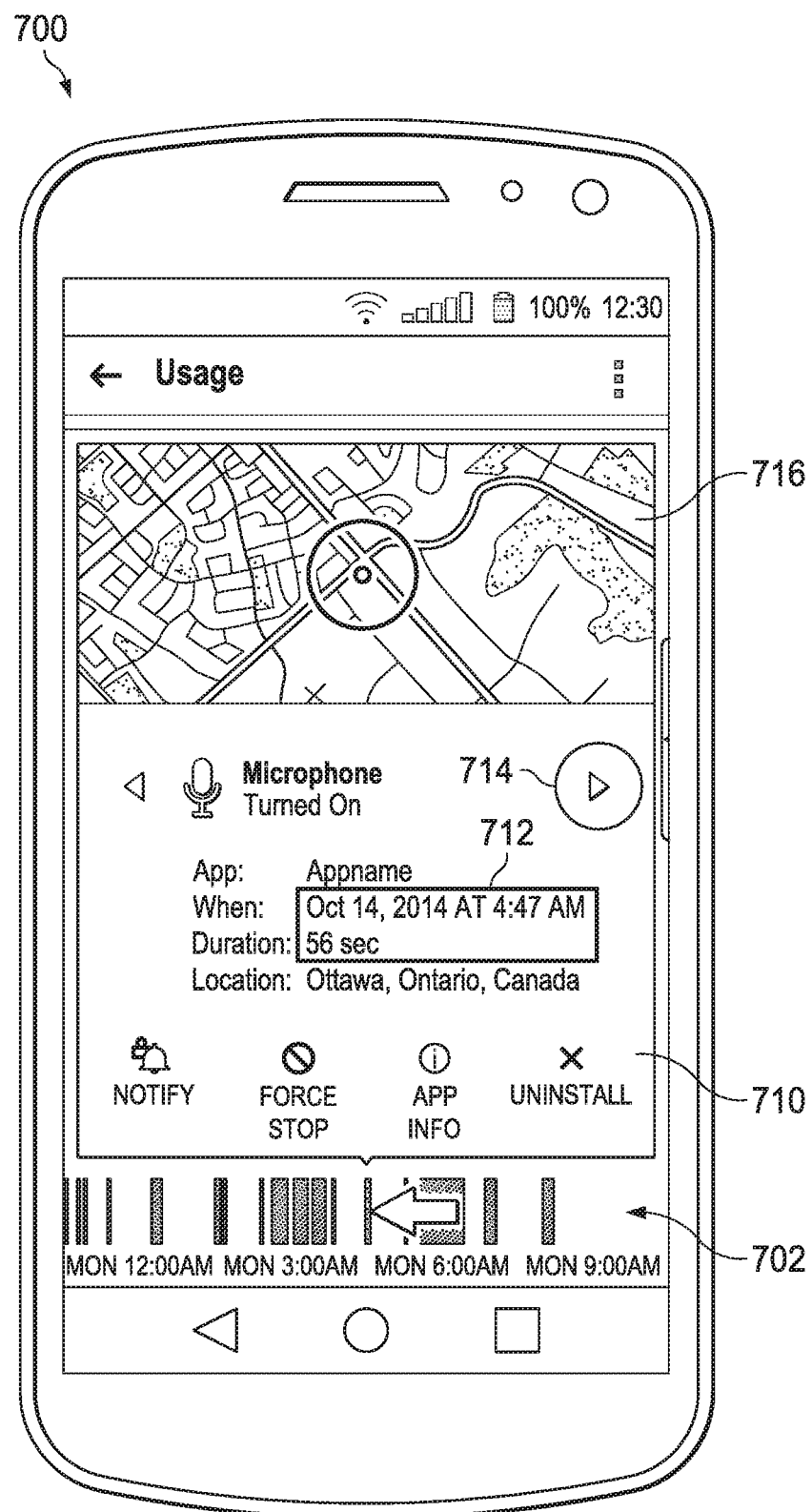
FIG. 7 shows an example graphic user interface outputting a timeline view.

In some cases, a plurality of resources access events, or composite events, can be outputted in a graphic user interface. For example, a timeline view of resource access within a monitoring period can be displayed. FIG. 7 shows an example graphic user interface 700 outputting a timeline view. The graphic user interface 700 shows the number of times a microphone has been turned on within the last 12 hours.

The graphic user interface 700 includes a timeline section 702. The timeline section 702 includes a plurality of vertical bars, each representing one microphone access event. The timeline section 702 also includes a time scale that indicates the time duration of the last 12 hours. The time scale includes labels showing different times within the 24 hours, e.g., 12 AM, 3 AM, 6 AM, 9 AM, and etc. As shown in FIG. 7, each vertical bar that represents one microphone access event is located on a position that corresponds to the time when the access is made. This approach provides an intuitive representation of the patterns of the resource access. For example, the bars are sparsely located between 12 AM to 3 AM but densely located around 6 AM, showing that the microphone is accessed rarely during 12 to 3 AM but frequently around 6 AM. In some cases, the graphic user interface 700 can provide a zoomed view in response to user actions. For example, if a user selects a portion in the timeline section 702, the corresponding portion can be zoomed in. The selection can be made by tapping, swiping, clicking, touching, or any other user actions interacting with the user interface of the electronic device. In one example, the user can swipe the bars located around 6 AM, the graphic user interface 700 can present a zoomed-in view in response. The zoomed-in view can enlarge the timescale around 6 AM and therefore show in more detail different accesses in that portion of time.

The graphic user interface 700 also includes an individual event section 710. The individual event section 710 can display detailed information associated with an individual event or composite event of resource access. For example, as shown in FIG. 7, the individual event section 710 shows the name of the application that accessed the microphone on Oct. 14, 2014 at 4:47 AM. The individual event section 710 includes a time section 712 that displays the event's time, duration, or a combination thereof. The individual event section 710 also includes a map section 716 that displays the location of the electronic device when the event occurred.

In some cases, the graphic user interface 700 can enable the user to traverse the individual events displayed in the timeline section 702. For example, the graphic user interface 700 includes a forward button 714. When the user selects the forward button 714, detailed information associated with the next event can be displayed in the individual event section 710. In some cases, a user can select a bar in the timeline section 702. In response, detailed information associated with the event corresponding to the selected bar can be displayed in the individual event section 710. Other user actions, e.g., scrolling, dragging, can also be used to change the event that is displayed in the individual event section 710.

In some cases, the timeline view can be used to display a plurality of resources accessed by one application during a monitoring period. In these cases, when the resource access events are traversed through a timeline, the name of the application in the individual event section 710 may stay the same, while the name of the resource may change. In some cases, the timeline view can be used to display a plurality of resources accessed by a plurality of applications during a monitoring period. In these cases, when the resource access events are traversed through a timeline, both the name of the application in the individual event section 710 and the name of the resource may change.

Figure 8:
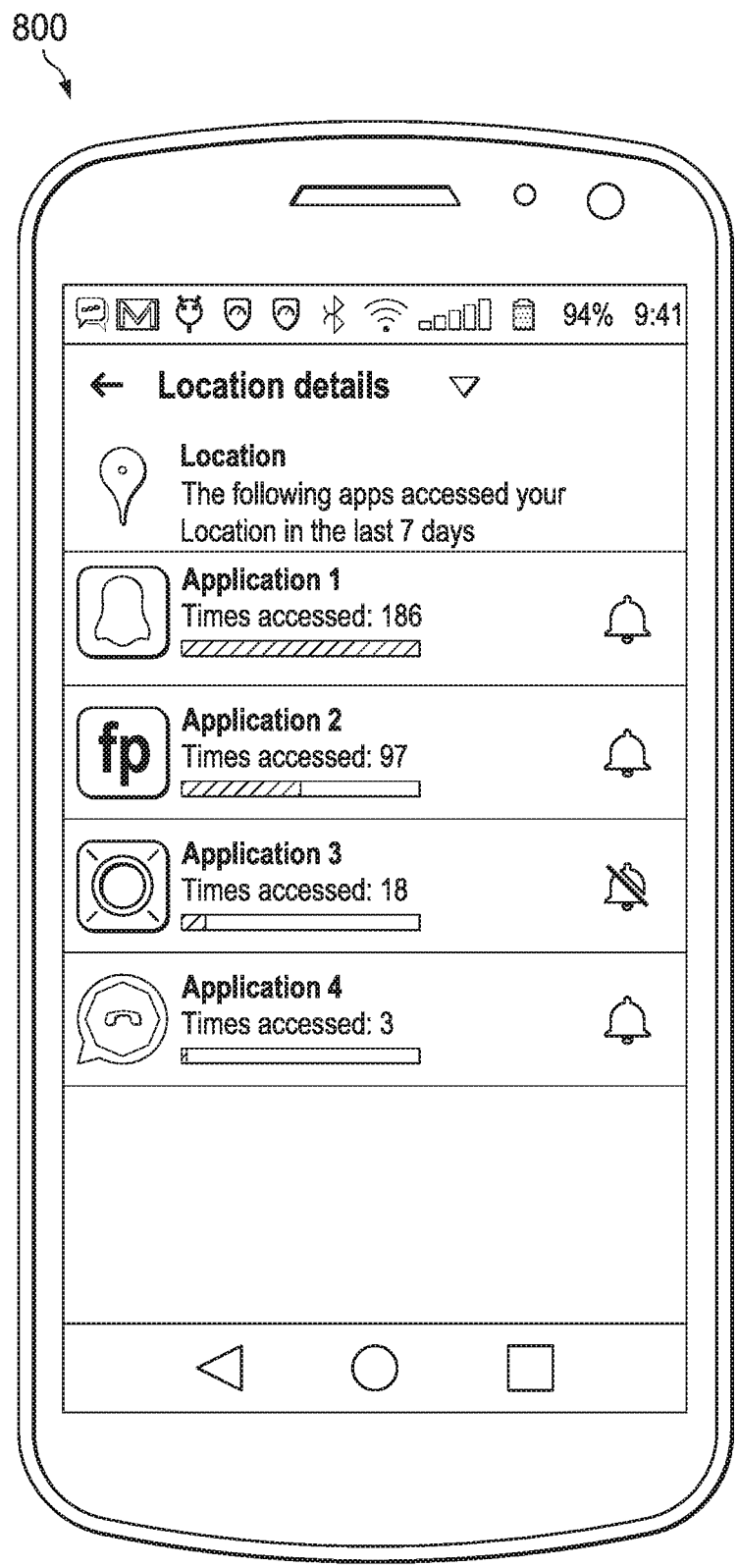
FIG. 8 shows an example graphic user interface outputting the number of resource access.

In some cases, the number of resource accesses made by an application within a monitoring period can be outputted. In some cases, the number of resource accesses can be represented in a linear scale. In one example, the number of resource accesses can be represented in a linear scale based on the number of accesses made by the application that had the most access during the monitoring period. FIG. 8 shows an example graphic user interface 800 outputting the number of resource accesses. As shown in FIG. 8, the graphic user interface 800 displays the number of times four applications used the location resource in a particular time period, e.g., the last 7 days. A graphic user interface object, e.g., a horizontal bar, is used to show the number of accesses relative to the application that made the most accesses. As shown in FIG. 8, Application 1 made 186 accesses, which is the highest number. Therefore, the shaded region in the horizontal bar under Application 1 occupies 186/186× 100%=100% of the bar. Application 2 made 97 accesses.

Therefore, the shaded region in the horizontal bar under Application 2 occupies 97/186×100%=52% of the bar. Applications 3 and 4 made 18 and 3 accesses, respectively. Therefore, the shaded region in the horizontal bars under these two applications occupy 10% and 2% of the bar, respectively. In some cases, different graphic representations, e.g., coloring, can be used instead of the shading.

Figure 9:
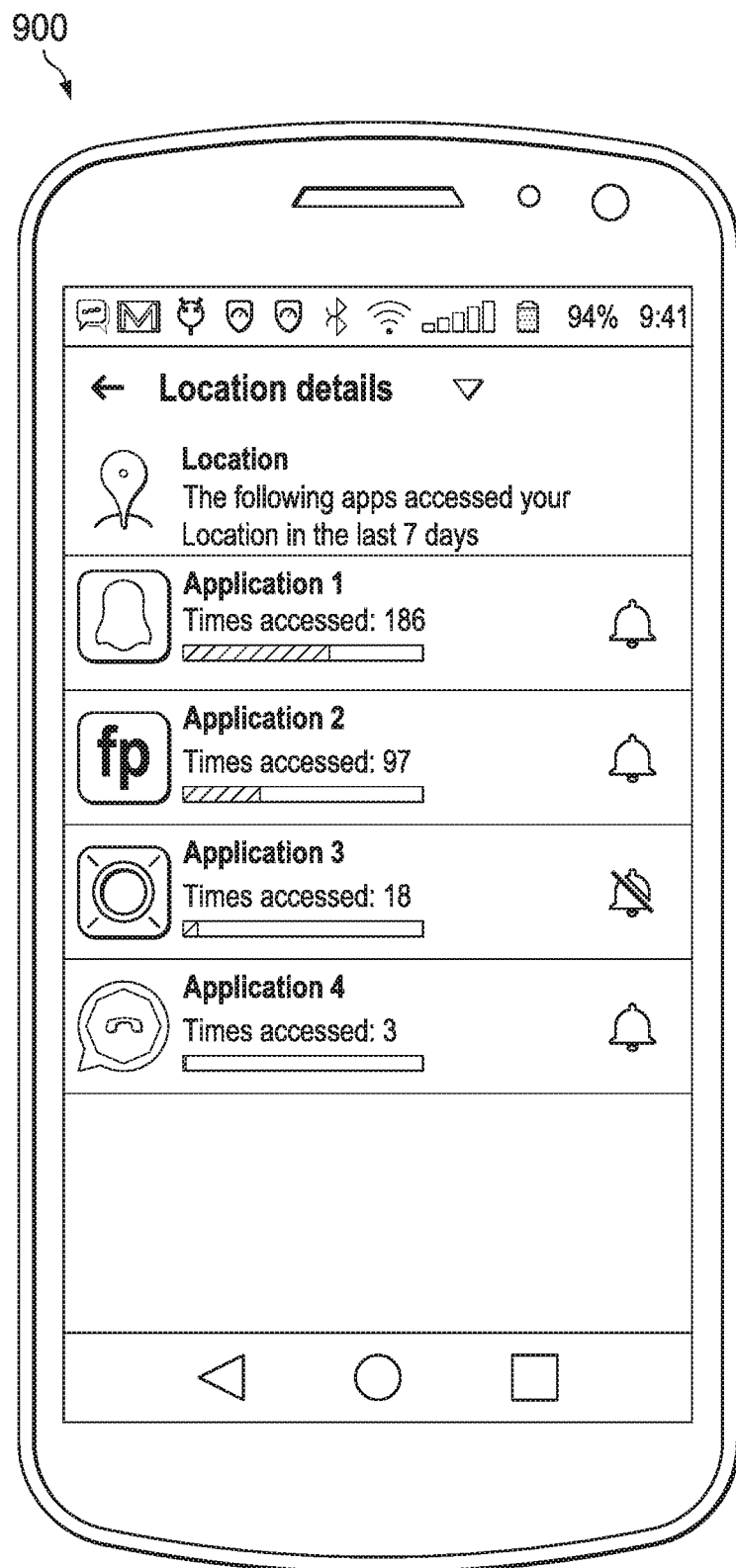
FIG. 9 shows another example graphic user interface outputting the number of resource access.

FIG. 9 shows another example graphic user interface 900 outputting the number of resource accesses. As shown in FIG. 9, the graphic user interface 900 outputs the number of times four applications used the location resource in a particular time period, e.g., the last 7 days. A graphic user interface object, e.g., a horizontal bar, is used to show the number of accesses one application made relative to total number of accesses made during the monitoring period. As shown in FIG. 9, the total number of accesses is 186+97+18+3=303. Therefore, the shaded region in the horizontal bar under Application 1 occupies 186/303×100%=61% of the bar. Application 2 made 97 accesses. Therefore, the shaded region in the horizontal bar under Application 2 occupies 97/303×100%=32% of the bar. Applications 3 and 4 made 18 and 3 accesses, respectively. Therefore, the shaded region in the horizontal bars under these two applications occupy 6% and 1% of the bar, respectively. In some cases, different graphic representations, e.g., coloring, can be used instead of the shading.

Figure 10:
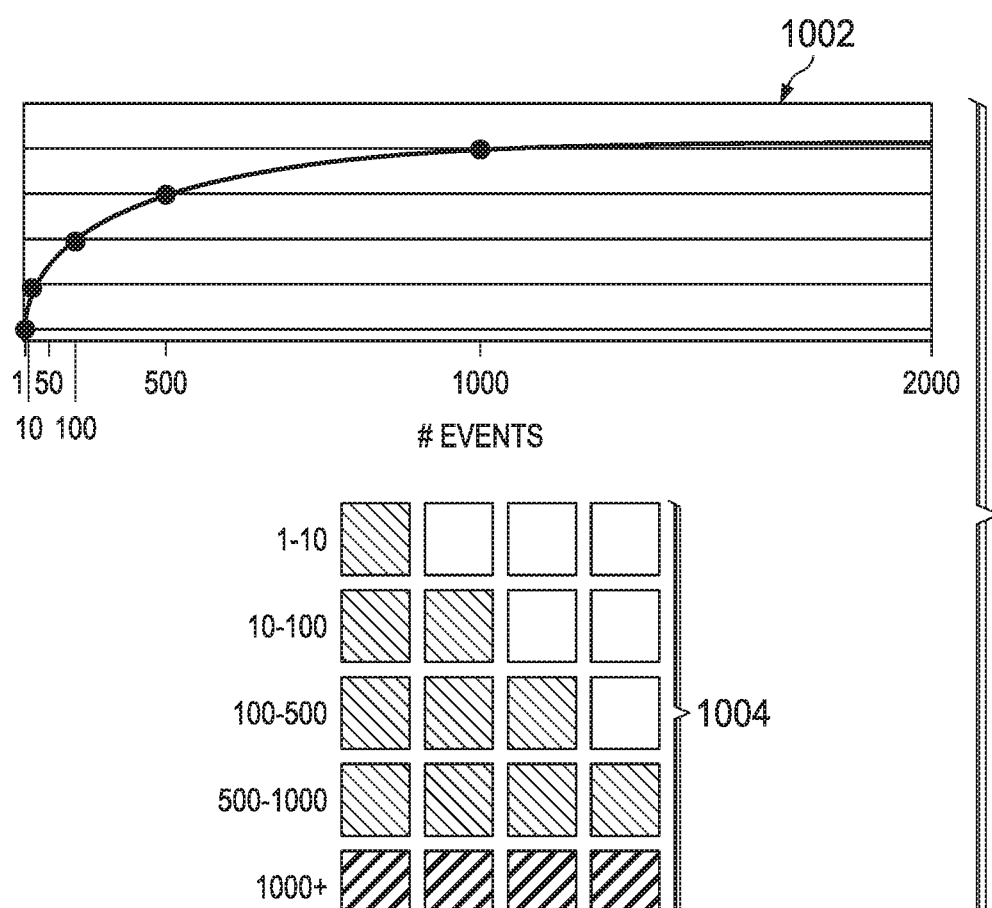
FIG. 10 is a schematic diagram showing nonlinear scaling of the number of resource accesses.

In some cases, nonlinear scale can be used to represent the number of resource accesses. FIG. 10 is a schematic diagram 1000 showing nonlinear scaling of the number of resource accesses. For example, as shown in FIG. 10, base 10 logarithm can be used to represent the number of resource accesses. The diagram 1000 includes a rating curve 1002 and a rating scheme 1004. The rating scheme 1004 shows the number of resource accesses can be quantized based on base 10 logarithm. The rating curve 1002 shows the quantization levels on a base 10 logarithm graph. The quantized number can be represented by a different number of boxes. For example, five quantization levels using base 10 logarithm can be used to represent 1-10 accesses, 10-100 accesses, 100-500 accesses, 500-1000 accesses, and over 1000 accesses. Therefore, if the number of accesses is between 1 and 10, 1 shaded or colored box can be used. If the number of accesses is between 10 and 100, 2 shaded or colored boxes can be used. If the number of access is between 100 and 500, 3 shaded or colored boxes can be used. If the number of accesses is between 500 and 1000, 4 shaded or colored boxes can be used. If the number of accesses is over 1000, 4 boxes with different shade or color can be used. For example, blue color can be used for the boxes representing 1-10, 10-100, 100-500, or 500-1000 accesses, and red color can be used to the boxes representing over 1000 accesses.

Figure 11:
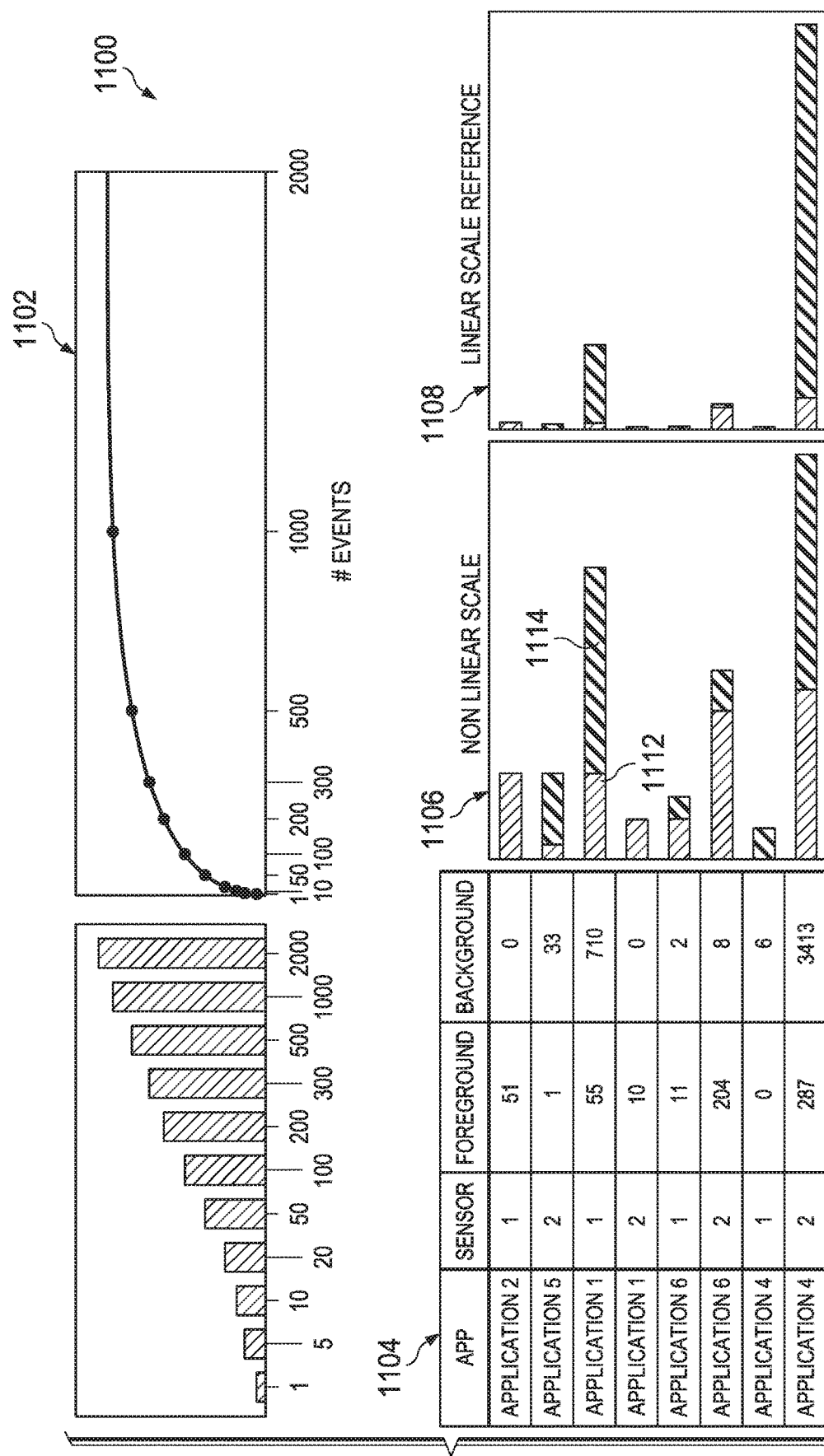
FIG. 11 is a schematic diagram showing a comparison of linear scale representations and nonlinear scale representations.

FIG. 11 is a schematic diagram 1100 showing a comparison of linear scale representations and nonlinear scale representations. The schematic diagram 1100 includes a quantization level scaling curve 1102 that shows the quantization levels according to base 10 logarithm scale. The schematic diagram 1100 also includes a table 1104 that shows the number of accesses to different resources made by different applications in foreground and in background. The schematic diagram 1100 includes a nonlinear scale representation 1106 and a linear scale representation 1108. In the nonlinear scale representation 1106, the length of the shaded bar is determined based on the number of accesses on a nonlinear scale. For example, the shaded portion 1112 represents the number of accesses made by Application 1 to resource 1 in foreground using base 10 logarithm. The shaded portion 1114 represents the number of accesses made by Application 1 to resource 1 in background using base 10 logarithm. In some cases, different shades or colors can be used to represent the number of accesses made in foreground and background, respectively.

In the linear scale representation 1108, the length of the shaded bar is determined based on the number of accesses on a linear scale. As shown in FIG. 11, because of the large differences between the number of accesses made by different applications, the numbers of accesses made by applications with small or medium number of accesses, e.g., Applications 2 and 5, may be difficult to be identified using the linear scale.

Figure 12A:
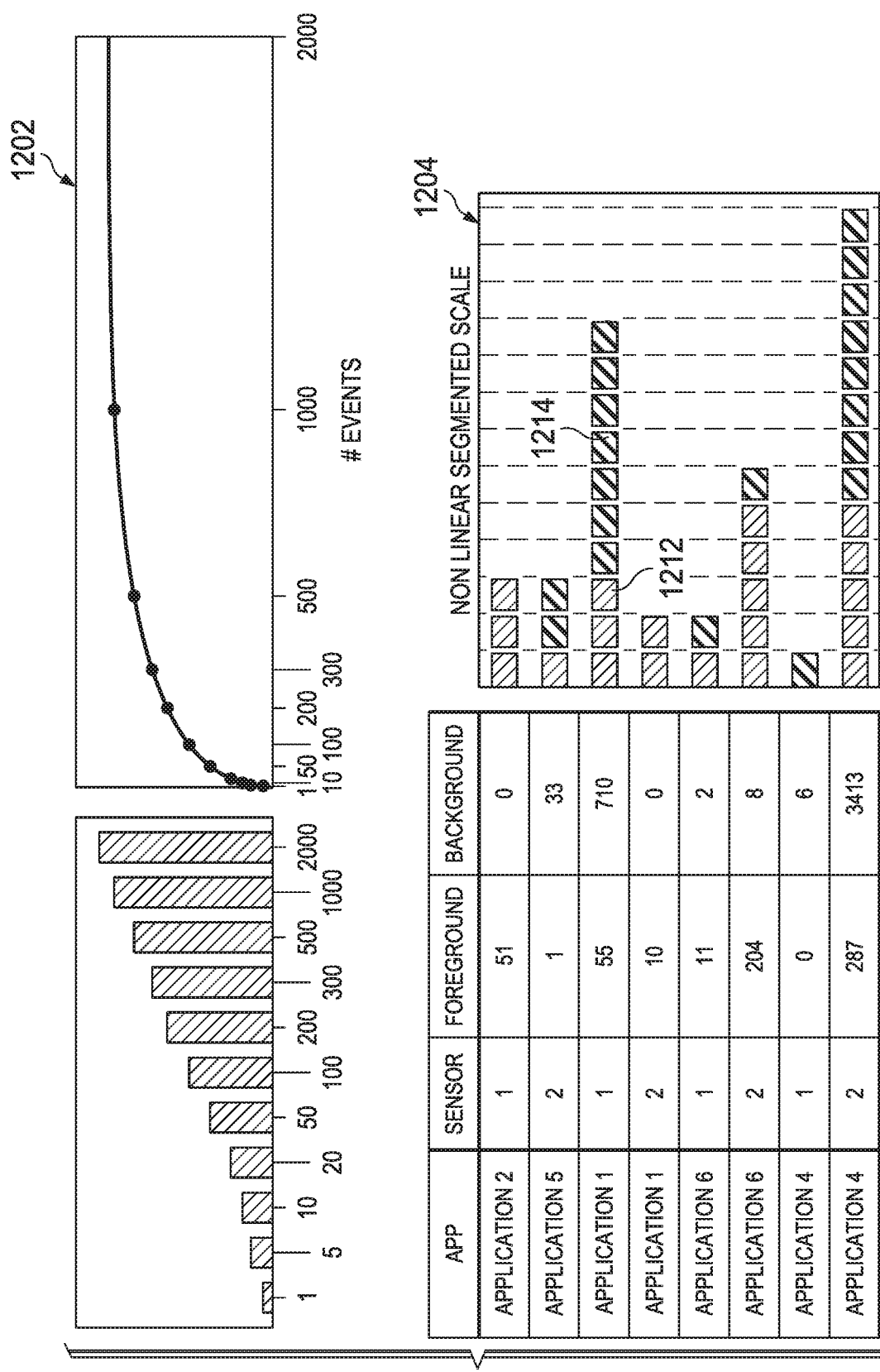
FIG. 12A and FIG. 12B, is another schematic diagram showing a comparison of linear scale representations and nonlinear scale representations.
Figure 12B:
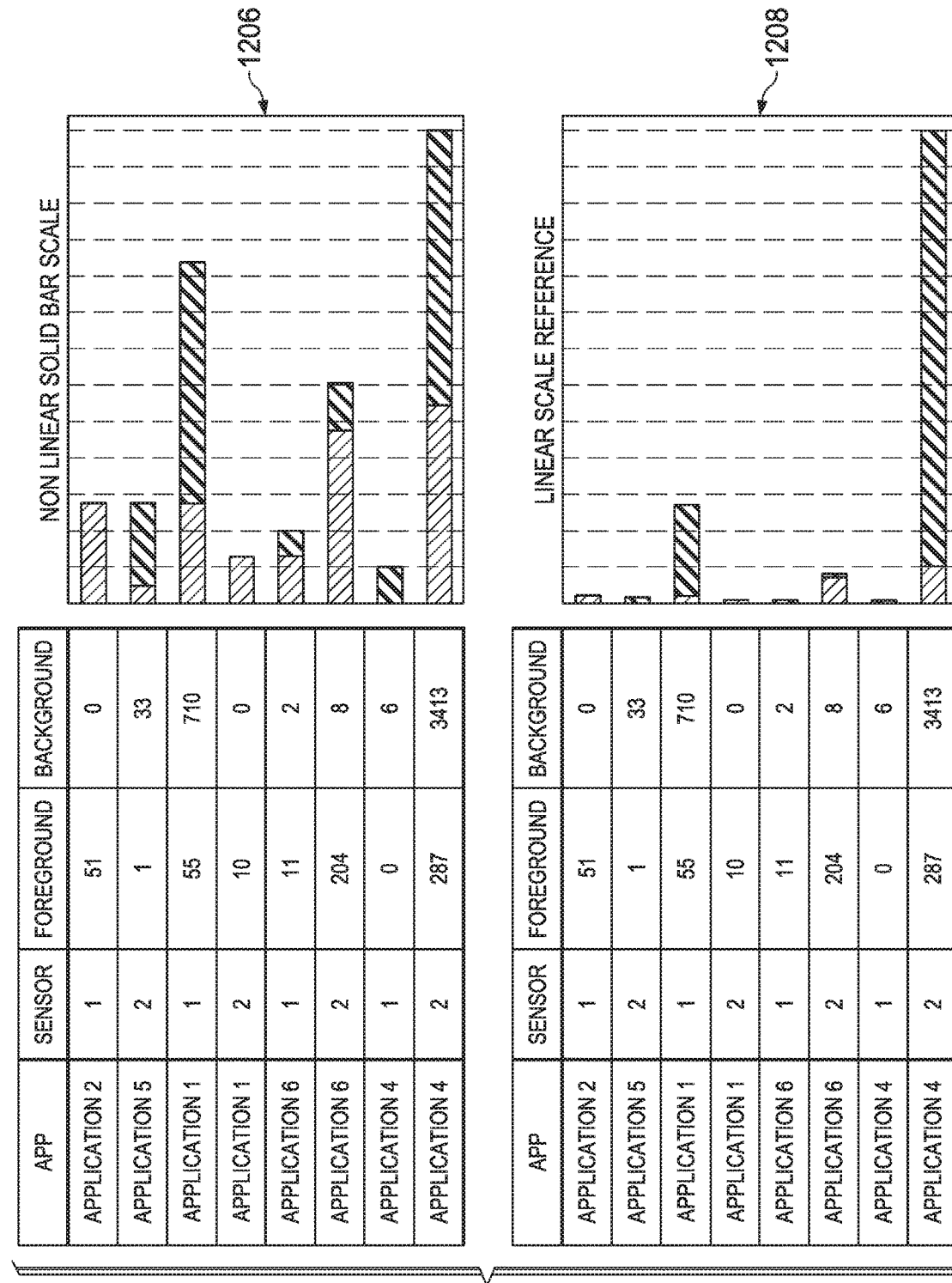

FIG. 12, including FIG. 12A and FIG. 12B, is a schematic diagram 1200 showing a comparison of linear scale representations and nonlinear scale representations. The schematic diagram 1200 includes a quantization level scaling curve 1202 that shows the quantization levels according to base 10 logarithm scale. The schematic diagram 1200 includes a nonlinear segmented representation 1204. In the nonlinear segmented representation 1204, one or more shaded boxes are used to represent the number of accesses on a nonlinear scale. As shown previously in FIG. 10, the number of shaded boxes that are used to indicate the quantized number of accesses can be determined based on the nonlinear scale. For example, the shaded portion 1212 shows that the number of accesses made by Application 1 to resource 1 in foreground is between 50 to 100, and the shaded portion 1214 shows that the number of accesses made by Application 1 to resource 1 in background is between 500 to 1000.

The schematic diagram 1200 also includes a nonlinear solid bar representation 1206 and a linear solid bar representation 1208. As discussed previously, the number of accesses made by applications with small or medium number of accesses may be difficult to be identified using the linear scale.

Figure 13:
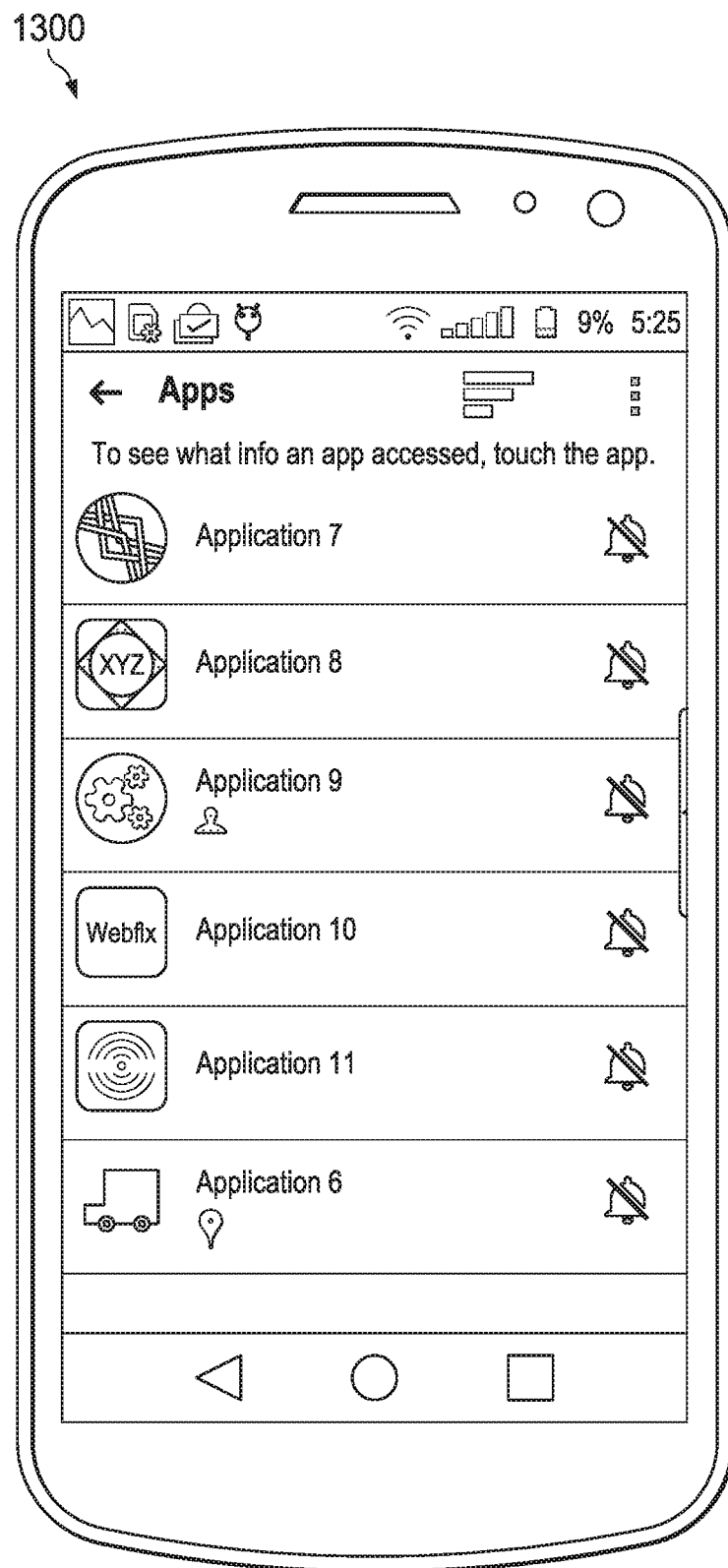
FIG. 13 shows an example graphic user interface outputting an application view.

In some cases, a graphic user interface can be used to enable a user to view the resource accesses made by one or more applications during a monitoring period. The graphic user interface can include an application view and an application detail view. An application view can include a list of applications on the electronic device. FIG. 13 shows an example graphic user interface 1300 outputting an application view. As shown in FIG. 13, the application view can include an application icon and an application name of each listed application. In some cases, a row of graphic user interface objects, e.g., icons, can be displayed under each application. Each of the rows of user interface objects can represent one resource that the application has accessed. In some cases, whether a notification is set whenever the application accesses a resource can be shown using a graphic user interface. For example, a grayed bell can be used to show that the notification is not set, and a colored bell can be used to show that the notification is set. In some cases, a user can select the notification object to set notification for an application. The user can set notification if the application accesses one individual resource or a set of resources. The user can also set notification if the application accesses a resource in background, in foreground, or a combination thereof. In some cases, if a notification is set, a user may be notified when an application is accessing the resource. The notification can include information, e.g., time, duration, location of the access.

Figure 14:
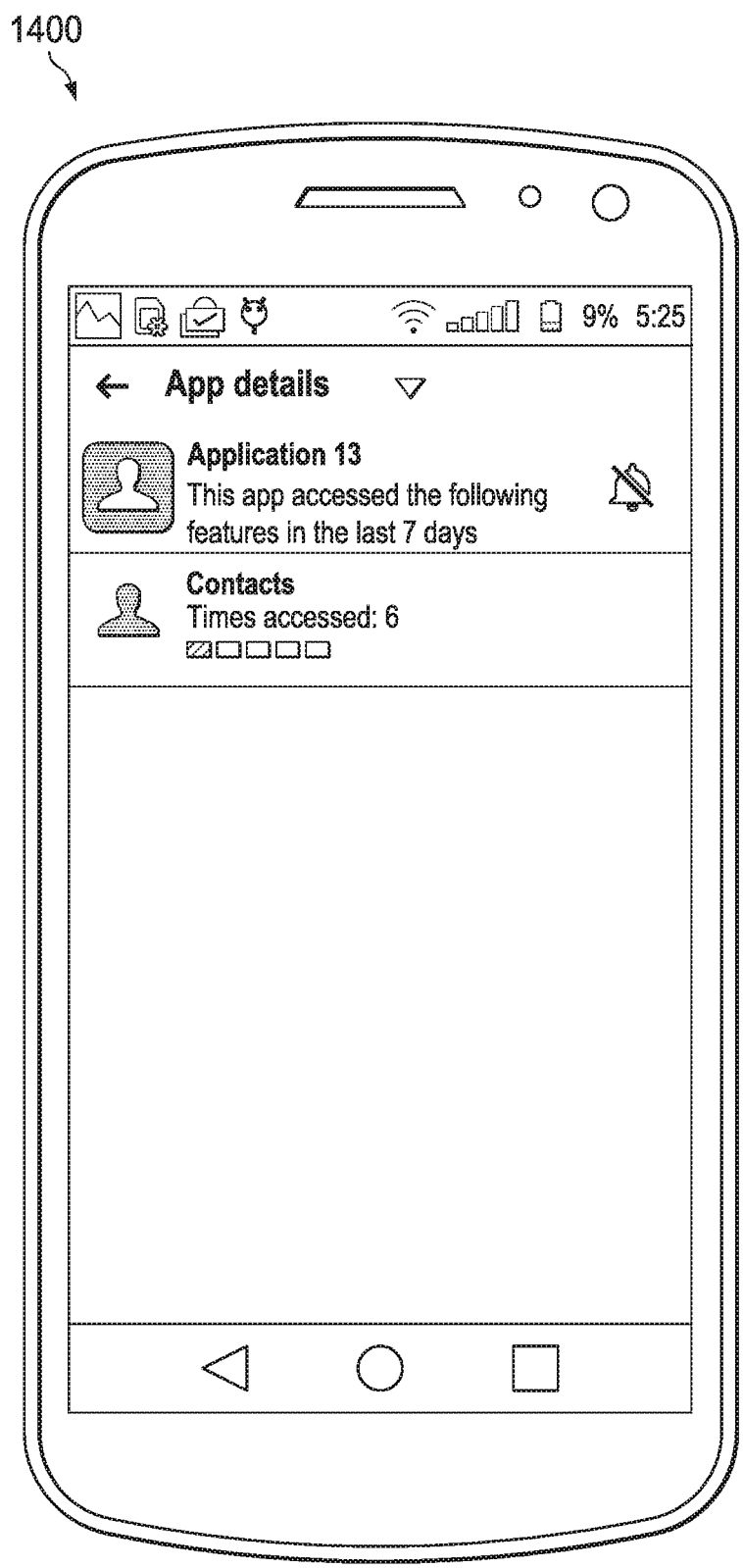
FIG. 14 shows an example graphic user interface outputting an application detail view.

The graphic user interface can also include an application detail view. An application detail view can indicate detailed information of resource accesses made by an individual application, e.g., the number of accesses made by an application to each resource during a monitoring period. FIG. 14 shows an example graphic user interface 1400 outputting an application detail view. In some cases, a user can click the icon or the name of an application in the application view to trigger the display of an application detail view. In some cases, the application detail view can also include a notification object that can be selected to set notifications for the application. As shown in FIG. 14, the application detail view can show a list of resources accessed by the application in the monitoring period. For each resource, the application detail view shows the number of accesses to that resource. As discussed previously in association with FIGS. 10-12, the number of accesses can be represented by a number of shaded or colored boxes based on quantized logarithmic scale.

Figure 15:
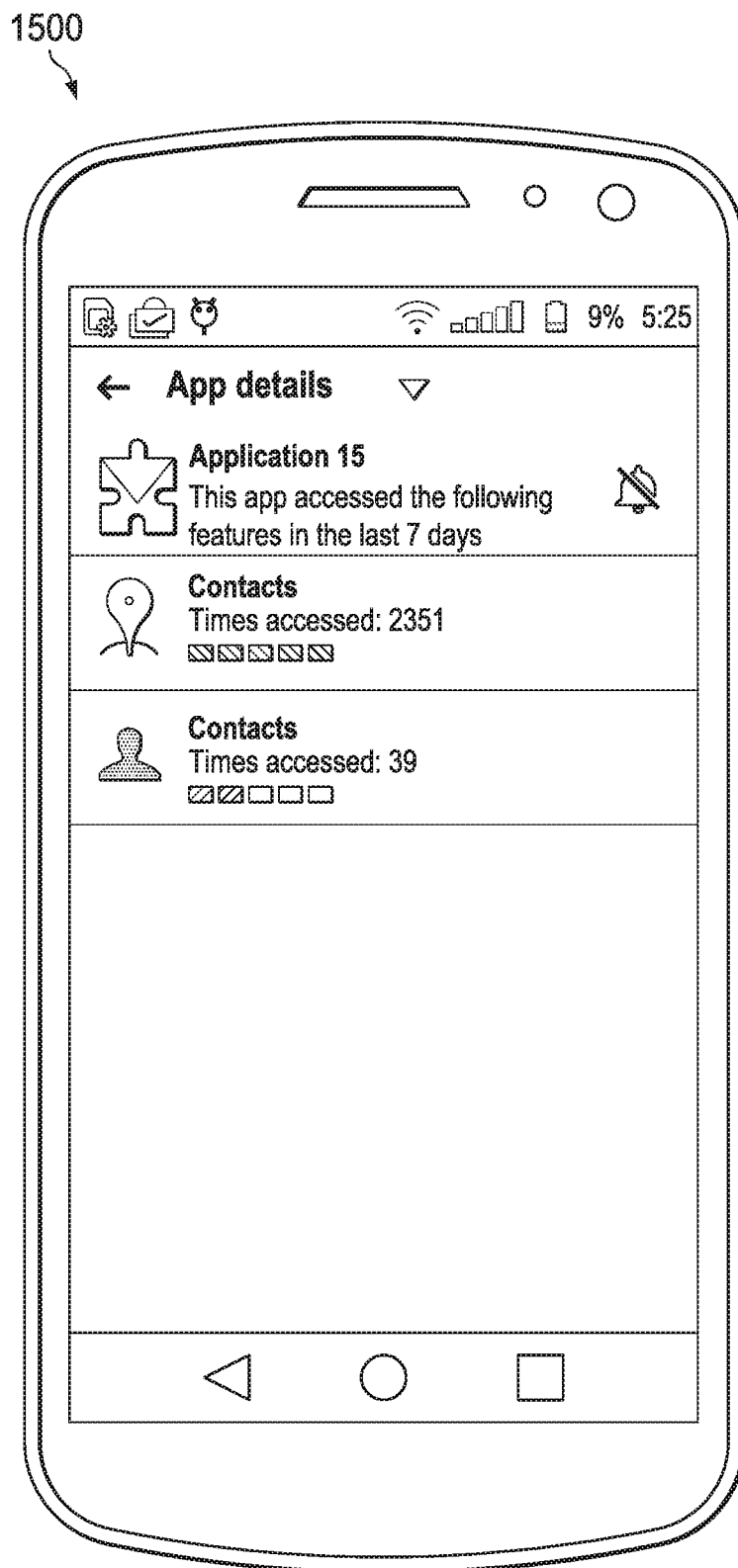
FIG. 15 shows another example graphic user interface outputting an application detail view.

FIG. 15 shows another example graphic user interface 1500 outputting an application detail view. In some cases, as discussed previously in association with FIG. 10, different shades or colors can be used to show that the number of accesses exceeds a configured threshold. As shown in FIG. 15, Application 15 has accessed the location resource for 2351 times in the last 7 days, which exceeded 1000. In this case, a different shade or color can be used for the row of boxes displayed below location. For example, red color can be used to fill the four boxes displayed below location while blue color can be used to fill the two boxes displayed below contacts.

Figure 16:
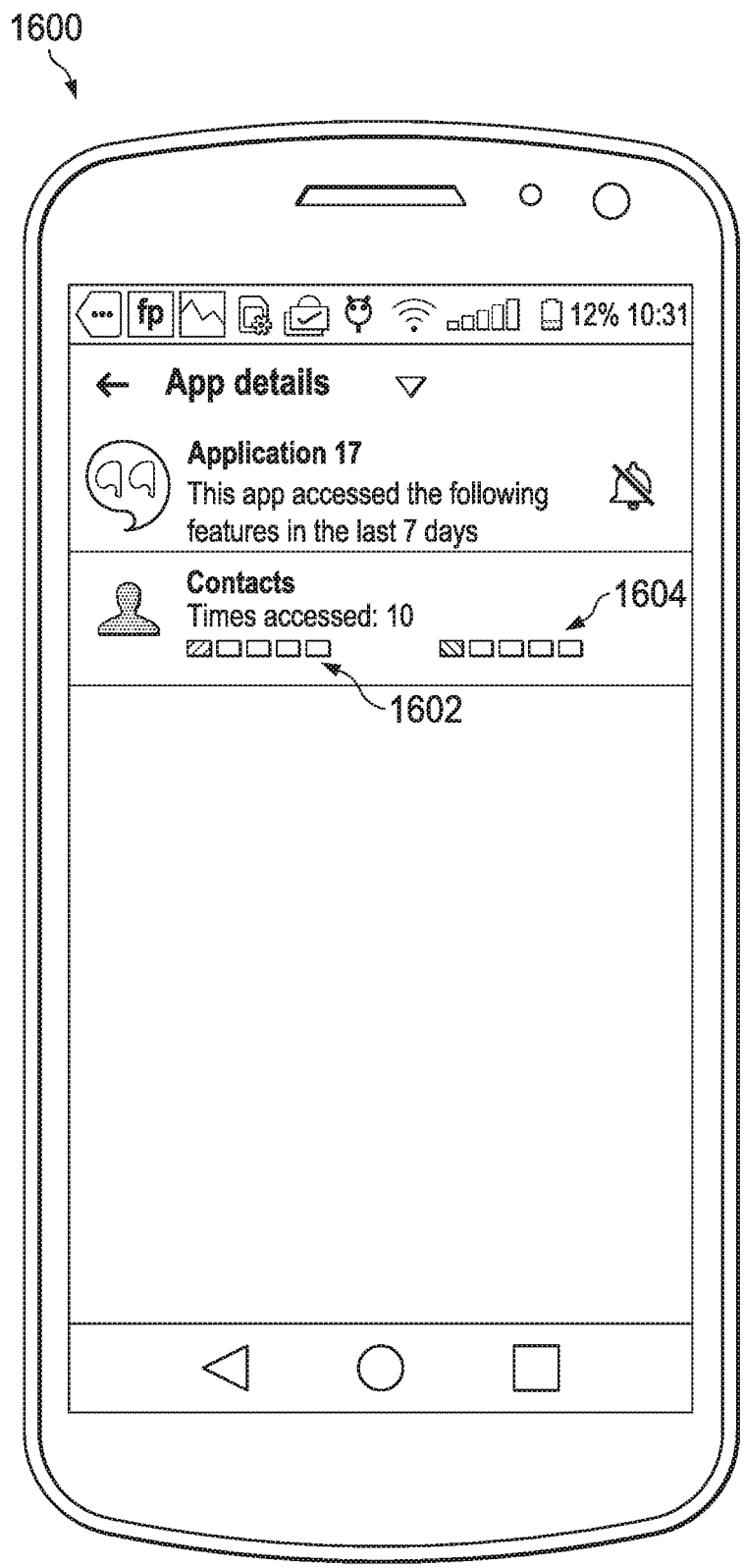
FIG. 16 shows yet another example graphic user interface outputting an application detail view.

FIG. 16 shows yet another example graphic user interface 1600 outputting an application detail view. In some cases, both the number of foreground accesses and background accesses can be outputted. The example graphic user interface 1600 includes representation 1602 that shows the quantized number of accesses made by Application 17 to the resource Contacts in foreground. The example graphic user interface 1600 also includes representation 1604 that shows the quantized number of accesses made by Application 17 to the resource Contacts in background. In some cases, as discussed previously in association with FIGS. 11-12, different shades or colors can be used to represent the numbers of accesses for applications running in foreground and the numbers of accesses for applications running in background. For example, blue may be used for foreground and purple may be used for background.

In some cases, duration of resource access can be accumulated and outputted. For example, the total duration of access to a resource made by an application during a monitoring period can be accumulated. The total duration can be outputted in a graphic user interface. As discussed previously in association with FIGS. 8-16, the total duration can be represented based on a linear scale or a nonlinear scale.

In some cases, because a user may not be aware of a background resource access, the background resource access may have a more severe impact on the privacy of a user than foreground resource access. Therefore, in some implementations, resource access by a background application can be monitored. A user can be pre-warned before a background access occurs, notified after the background access occurs, or a combination thereof. FIG. 3 is a flowchart showing an example process 300 for monitoring background resource access. The process 300 can be implemented by a user device in a communication system. For example, the process 300 can be implemented by the electronic device 102 shown in FIG. 1 or by another type of system or module. The example process 300 shown in FIG. 3 can also be implemented using additional, fewer, or different operations, which can be performed in the order shown or in a different order.

The example process 300 begins at 302, where an application attempting to access a resource on an electronic device is determined. In some cases, when an application attempts to access a resource, the application interacts with an application programming interface (API) associated with the resource. The operating system of the electronic device, or a software module running on the operating system, can be notified when the API is interacted.

At 304, whether the application is operating in a foreground of the operating system or in a background of the operating system is determined. In some cases, when an application is running in the background, an attribute associated with the application is set to indicate that the application is running in the background. In some cases, the attribute can be checked to determine whether the application is running in the foreground or the background.

If the application is determined to operate in the foreground, the process 300 proceeds from 304 to 306, where the application is permitted to access the resource. As discussed previously, in some cases, the foreground access is not monitored. Alternatively or in combination, the foreground access is monitored and the number of foreground accesses can be outputted. In some cases, whether only background access is monitored can be configured.

If the application is determined to operate in the background, the process 300 proceeds from 304 to 308, where a notification is generated. The notification indicates that a background application attempts to access a resource. At 310, the notification is outputted via a user interface of the electronic device. As discussed previously, in some cases, the notification can include information, e.g., time, duration, location, of the access.

In some cases, user authorization can be required for a background application to access a resource. For example, at 312, a user input indicating whether the application is permitted to access the resource can be received. The user input can be a selection of a user interface object, a tap, a touch, a click, a scroll, or any other user actions. If the user input indicates that the application is permitted to access the resource, the process 300 proceeds from 312 to 314, where the application is permitted to access the resource in the background. If the user input indicates that the application is not permitted to access the resource, the process 300 proceeds from 312 to 316, where the application is prevented from accessing the resource.

In some cases, an operating system, a user, a system administrator, or a combination thereof can configure whether background access is permitted with authorization, permitted without authorization, or not permitted for a particular application, a particular resource, or a combination thereof.

Figure 4:
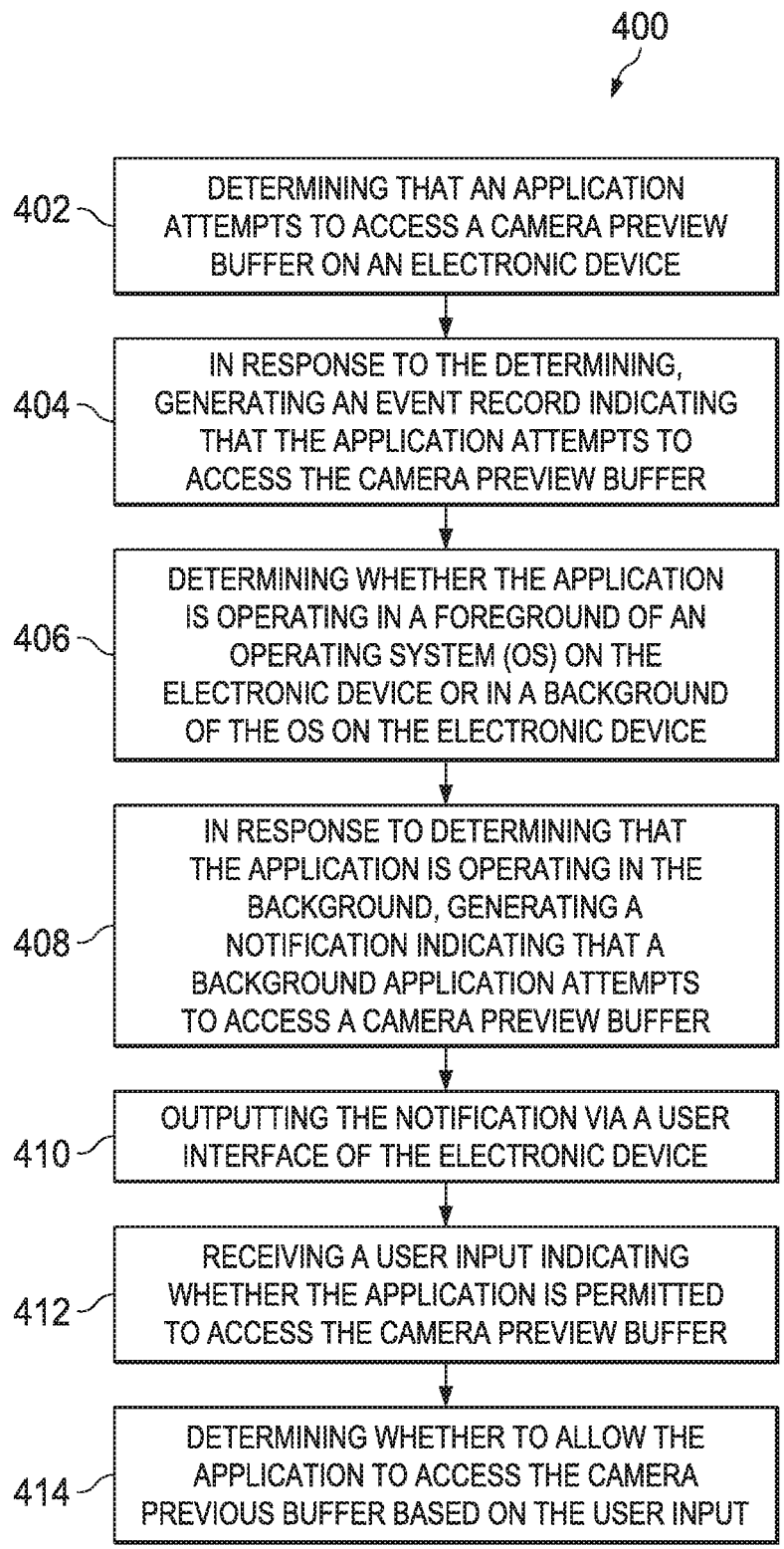
FIG. 4 is a flowchart showing an example process for monitoring access to a camera previous buffer.

In some cases, access to a camera preview buffer is monitored. FIG. 4 is a flowchart showing an example process 400 for monitoring access to a camera previous buffer. The process 400 can be implemented by a user device in a communication system. For example, the process 400 can be implemented by the electronic device 102 shown in FIG. 1 or by another type of system or module. The example process 400 shown in FIG. 4 can also be implemented using additional, fewer, or different operations, which can be performed in the order shown or in a different order.

The example process 400 begins at 402, where an application attempts to access a camera preview buffer on an electronic device is determined. In some cases, the camera preview buffer can be a resource whose access is monitored and reported. For example, an event can be configured for the camera preview buffer. In some cases, the event can be triggered when an application accesses an API that is associated with the camera preview buffer. For example, the event can be triggered when the application attempts to open the camera preview buffer, read any files in the camera preview buffer, or a combination thereof.

At 404, in response to the determining, an event record indicating that the application attempts to access the camera preview buffer is generated. In some cases, as discussed previously, the event record can be accumulated over a monitoring period. In some cases, the accumulated event record can be outputted, e.g., in a timeline view or in an application detail view.

Alternatively or in combination, user permissions can be required for a background application accessing the camera preview buffer. For example, at 406, whether the application is operating in the foreground of an operating system or in the background of the operating system is determined. In some cases, if the application is operating in the foreground, the permission can be granted. If the application is determined to be operating in the background, at 408, a notification is generated. The notification can indicate that a background application attempts to access a camera preview buffer. As discussed previously, in some cases, the notification can include information, e.g., time, duration, location, of the access. At 410, the notification is outputted via a user interface of the electronic device.

At 412, a user input is received. The user input can indicate whether the application is permitted to access the camera preview buffer. The user input can be a selection of a user interface object, a tap, a touch, a click, a scroll, or any other user actions. At 414, whether to allow the application to access the camera previous buffer is determined based on the user input. If the user input indicates that the application is permitted to access the camera preview buffer, the access can be granted. If the user input indicates that the application is not permitted to access the resource, the access can be denied.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices). The computer storage medium can be transitory or non-transitory.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. A computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for outputting information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing form the spirit and scope disclosed herein.

While the above detailed description has shown, described, and pointed out the fundamental novel features of the disclosure as applied to various implementations, it will be understood that various omissions, substitutions, and changes in the form and details of the system illustrated may be made by those skilled in the art, without departing from the intent of the disclosure. In addition, the order of method steps is not implied by the order they appear in the claims.

What is claimed is:

1. A method, comprising:
   determining a monitoring period for monitoring resource access on an electronic device;
   determining a number of accesses to a resource on the electronic device made by an application during the monitoring period;
   generating a graphic representation of a quantized number of accesses, wherein the quantized number of accesses represents the number of accesses that is quantized using a logarithm scale; and
   outputting, on the electronic device, the generated graphic representation representing the quantized number of accesses, wherein the generated graphic representation includes at least one of a name of the application or a name of the resource.

2. The method of claim 1, further comprising:
   determining a time when the application made an access to the resource during the monitoring period; and
   outputting, on the electronic device, the time when the access is made.

3. The method of claim 1, further comprising:
   determining a location of the electronic device when the application made an access to the resource during the monitoring period; and
   outputting, on the electronic device, the location of the electronic device when the access is made.

4. The method of claim 1, further comprising outputting a timeline view of resource access on the electronic device, wherein the timeline view includes a plurality of graphic user interface objects, each of the plurality of graphic user interface objects represents an access to the resource made by the application, and each of the plurality of graphic user interface objects is displayed at a position corresponding to a time when the respective access is made.

5. The method of claim 4, further comprising:
   receiving a user input selecting one of the plurality of graphic user interface objects; and
   in response to the user input, outputting information associated with an access to the resource that is represented by the selected graphic user interface object.

6. The method of claim 1, further comprising receiving, at the electronic device, a configuration for monitoring resource access, wherein the configuration indicates at least one of the application, the resource, or the monitoring period.

7. The method of claim 1, wherein the resource includes a camera preview buffer.

8. The method of claim 1, further comprising:
   determining that the application attempts to access the resource on the electronic device;
   determining whether the electronic device is in an idle state;
   if the electronic device is not in the idle state, permitting the application to access the resource; and
   if the electronic device is in the idle state, generating a notification indicating that a background application attempts to access a resource.

9. An electronic device, comprising:
   a memory; and
   at least one hardware processor communicatively coupled with the memory and configured to;
   determine a monitoring period for monitoring resource access on the electronic device;
   determine a number of accesses to a resource on the electronic device made by an application during the monitoring period;
   generate a graphic representation of a quantized number of accesses, wherein the quantized number of accesses represents the number of accesses that is quantized using a logarithm scale; and
   output, on the electronic device, the generated graphic representation representing quantized number of accesses, wherein the generated graphic representation includes at least one of a name of the application or a name of the resource.

10. The electronic device of claim 9, wherein the at least one hardware processor is further configured to:
- determine a time when the application made an access to the resource during the monitoring period; and
- output, on the electronic device, the time when the access is made.

11. The electronic device of claim 9, wherein the at least one hardware processor is further configured to:
- determine a location of the electronic device when the application made an access to the resource during the monitoring period; and
- output, on the electronic device, the location of the electronic device when the access is made.

12. The electronic device of claim 9, wherein the at least one hardware processor is further configured to output a timeline view of resource access on the electronic device, wherein the timeline view includes a plurality of graphic user interface objects, each of the plurality of graphic user interface objects represents an access to the resource made by the application, and each of the plurality of graphic user interface objects is displayed at a position corresponding to a time when the respective access is made.

13. The electronic device of claim 12, wherein the at least one hardware processor is further configured to:
- receive a user input selecting one of the plurality of graphic user interface objects; and
- in response to the user input, output information associated with an access to the resource that is represented by the selected graphic user interface object.

14. The electronic device of claim 9, wherein the at least one hardware processor is further configured to receive, at the electronic device, a configuration for monitoring resource access, wherein the configuration indicates at least one of the application, the resource, or the monitoring period.

15. The electronic device of claim 9, wherein the resource includes a camera preview buffer.

16. A non-transitory computer-readable medium containing instructions which, when executed, cause a computing device to perform operations comprising:
- determining a monitoring period for monitoring resource access on an electronic device;
- determining a number of accesses to a resource on the electronic device made by an application during the monitoring period;
- generating a graphic representation of a quantized number of accesses, wherein the quantized number of accesses represents the number of accesses that is quantized using a logarithm scale; and
- outputting, on the electronic device, the generated graphic representation representing the quantized number of accesses, wherein the generated graphic representation includes at least one of a name of the application or a name of the resource.

17. The non-transitory computer-readable medium of claim 16, the operations further comprising:
- determining a time when the application made an access to the resource during the monitoring period; and
- outputting, on the electronic device, the time when the access is made.

18. The non-transitory computer-readable medium of claim 16, the operations further comprising:
- determining a location of the electronic device when the application made an access to the resource during the monitoring period; and
- outputting, on the electronic device, the location of the electronic device when the access is made.

* * * * *